United States Patent
Upadhyay

(10) Patent No.: US 10,137,887 B2
(45) Date of Patent: Nov. 27, 2018

(54) METHOD FOR CONTROLLING AT LEAST ONE SAFETY FUNCTION FOR A MOTOR VEHICLE

(71) Applicant: Robert Bosch GmbH, Stuttgart (DE)

(72) Inventor: Sushil Kumar Upadhyay, Bangalore (IN)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/013,735

(22) Filed: Feb. 2, 2016

(65) Prior Publication Data

US 2016/0236678 A1    Aug. 18, 2016

(30) Foreign Application Priority Data

Feb. 18, 2015   (DE) .................. 10 2015 202 919

(51) Int. Cl.
| | |
|---|---|
| *B60R 21/015* | (2006.01) |
| *B60R 21/02* | (2006.01) |
| *B60R 22/00* | (2006.01) |
| *B60W 30/02* | (2012.01) |
| *B60N 2/00* | (2006.01) |
| *B60K 35/00* | (2006.01) |
| *B60Q 9/00* | (2006.01) |
| *B60N 2/26* | (2006.01) |

(52) U.S. Cl.
CPC ........... *B60W 30/025* (2013.01); *B60K 35/00* (2013.01); *B60N 2/002* (2013.01); *B60N 2/26* (2013.01); *B60Q 9/00* (2013.01); *B60K 2350/352* (2013.01)

(58) Field of Classification Search
CPC ..... B60W 30/025; B60K 35/00; B60N 2/002; B60N 2/26; B60Q 9/00
See application file for complete search history.

(56) References Cited

U.S. PATENT DOCUMENTS

2010/0138113 A1*   6/2010   Lee .......................... B60Q 9/00
                                                                                    701/45

* cited by examiner

*Primary Examiner* — Adam D Tissot
(74) *Attorney, Agent, or Firm* — Norton Rose Fulbright US LLP; Gerard Messina

(57) ABSTRACT

A method for controlling at least one safety function for a motor vehicle includes: a step of determining seat occupancy information, which indicates whether a seat of the vehicle is occupied by a child or not, based on sensor signals originating from a seat belt buckle sensor of the seat and from a weight sensor in the seat; and a step of applying a control signal, which includes child safety settings, depending on the seat occupancy information, to an interface for at least one vehicle safety device.

21 Claims, 2 Drawing Sheets

METHOD FOR CONTROLLING AT LEAST ONE SAFETY FUNCTION FOR A MOTOR VEHICLE

BACKGROUND OF THE INVENTION

1. Field of the Invention

The present invention relates to a method for controlling at least one safety function for a motor vehicle, a corresponding controller, a vehicle safety system, and a corresponding computer program.

2. Description of the Related Art

Regarding children as passengers in motorized vehicles, in particular, special protective measures may be taken to facilitate and enhance child safety on board. US Patent Application Publication 2010/0138113 A1 discloses a control system and method for protecting infant and child occupants in vehicle.

BRIEF SUMMARY OF THE INVENTION

Against this background, there are presented a method for controlling at least one safety function for a motor vehicle, a controller using this method, a vehicle safety system, and a corresponding computer program.

According to embodiments of the present invention, in particular, the presence of at least one child in a motor vehicle may be detected by redundant means. In case of positive detection of a child on board the vehicle, at least one feature for enhancing child safety may then be initiated, activated or enabled. For example, a number of such safety functions or features may be initiated, activated or enabled if at least one child has been detected occupying a seat in the vehicle.

Advantageously, according to embodiments of the present invention, child-onboard detection in a vehicle can be effected in a particularly failsafe and reliable manner by means of diversely redundant sensors. Thus, additional safety for children onboard motorized vehicles can be achieved by using such reliable data on seat occupancy status to parameterize at least one child-protective vehicle system.

The present invention provides a method for controlling at least one safety function for a motor vehicle, wherein the method comprises a step of determining seat occupancy information, which indicates whether a seat of the vehicle is occupied by a child or not, based on sensor signals originating from a seat belt buckle sensor of the seat and from a weight sensor in the seat, and a step of applying a control signal, which comprises child safety settings, depending on the seat occupancy information to an interface to at least one vehicle safety device.

The vehicle or motor vehicle may be a motorized vehicle, particularly a road vehicle, such as a motorized passenger vehicle or car, a bus, a truck, other utility vehicle or the like. The child may be a newborn, baby, infant, toddler or the like. The seat belt buckle sensor may comprise a normally open switch. Alternatively, the seat belt buckle sensor may comprise a normally closed switch. The seat belt buckle sensor may output a first sensor signal if a seat belt associated with the seat is closed. The weight sensor may output a second sensor signal if the seat is occupied by a child. The seat occupancy information indicating that a seat of the vehicle is occupied by a child may be determined if both sensor signals have been received. The step of applying may be carried out if the seat occupancy information indicates that a seat of the vehicle is occupied by a child. In other words, the control signal may be applied to the interface to at least one vehicle safety device if the seat occupancy information indicates that a seat of the vehicle is occupied by a child.

According to one embodiment in the step of applying the control signal may be applied to an interface to a rear-window display device or controller, wherein the control signal may cause the rear-window display device or controller to display a child-on-board or baby-on-board message for following traffic. The message may be projected onto the rear window of the vehicle. Such an embodiment may offer the advantage that other vehicle is or traffic following the vehicle can be informed of the fact that a child is on board the vehicle.

Furthermore, in the step of applying the control signal may be applied to an interface to a vehicle speed controller, wherein the control signal may cause the vehicle speed controller to limit vehicle speed to a child-safe level. The child-safe level may refer to a predetermined or adjustable vehicle velocity. The vehicle speed controller may be configured to automatically keep the vehicle speed within the child-safe level or to prompt a driver to keep the vehicle speed within the child-safe level. Such an embodiment may offer the advantage that safety for children on board may be improved significantly, as a reduced speed may alleviate possible crash effects.

Also, in the step of applying the control signal may be applied to an interface to a feedback output device or controller, wherein the control signal may cause the feedback output device or controller to issue an acoustic, optical and additionally or alternatively haptic warning signal regarding child-safe driving parameters. Child-safe driving parameters may comprise a child-safe level of vehicle speed. In particular, the feedback output device or controller may be configured to issue the warning signal in case child-safe driving parameters are violated. Such an embodiment may offer the advantage that even in cases where child-safe driving parameters cannot be maintained automatically by vehicle systems the driver can be prompted to drive with particular care due to the child on board.

Moreover, in the step of applying the control signal may be applied to an interface to a vehicle systems controller, wherein the control signal may cause the vehicle systems controller to block disabling of at least one vehicle safety system or function. The at least one vehicle safety system or function may comprise the so-called Electronic Stability Control or Electronic Stability Program and additionally or alternatively other vehicle functions or driver assistance systems. Disabling such a system or function may be part of manually activating a special driving mode, such as sports mode. Such an embodiment may offer the advantage that driving states with potentially higher risk of causing harm to a child on board can be avoided reliably.

Additionally or alternatively, in the step of applying the control signal may be applied to an interface to a door and window lock actuator or controller, wherein the control signal may cause the door and window lock actuator or controller to lock at least one vehicle door and/or window adjacent to the seat when the vehicle is moving. In other words, the door and window lock actuator or controller may be configured to use the control signal to activate the child lock of child safety lock of a number of vehicle doors and windows. Such an embodiment may offer the advantage that safety very child on board can be enhanced further.

The invention also provides a controller configured to execute, control and/or carry out the steps of a variant of the above-mentioned method using corresponding means. The object underlying the invention may also be achieved quickly and efficiently by a variant of the invention in form of a controller.

A controller may be understood as an electrical device processing sensor signals and outputting control and/or data signals depending thereon. The controller may comprise a hardware and/or software interface. In case of hardware, the interfaces may for example be part of a so-called system ASIC comprising various functions of the controller. It may also be possible for the interfaces to be distinct integrated circuits are at least partially comprise discrete devices. In case of software, the interfaces may be software modules present on a microcontroller along with other software modules, for example.

The present invention further provides a vehicle safety system, comprising at least one vehicle safety device, a seat belt buckle sensor and an in-seat weight sensor, and further comprising a variant of the above-mentioned controller, wherein the controller is communicatively connected to the least one vehicle safety device, to the seat belt buckle sensor and to the weight sensor.

The system may be used advantageously in conjunction with an embodiment of the above-mentioned controller in order to provide enhanced vehicle occupant protection for a child on board.

What is also advantageous is a computer program product or computer program comprising program code that may be stored on a machine-readable carrier of storage medium, such as a semiconductor storage unit, fixed-disk storage unit or optical storage unit, and is used for executing, carrying out and/or controlling the steps of the method of one of the above-described embodiments, particularly when the program product or program is executed on a computer or device.

DETAILED DESCRIPTION OF THE INVENTION

Figure 1:
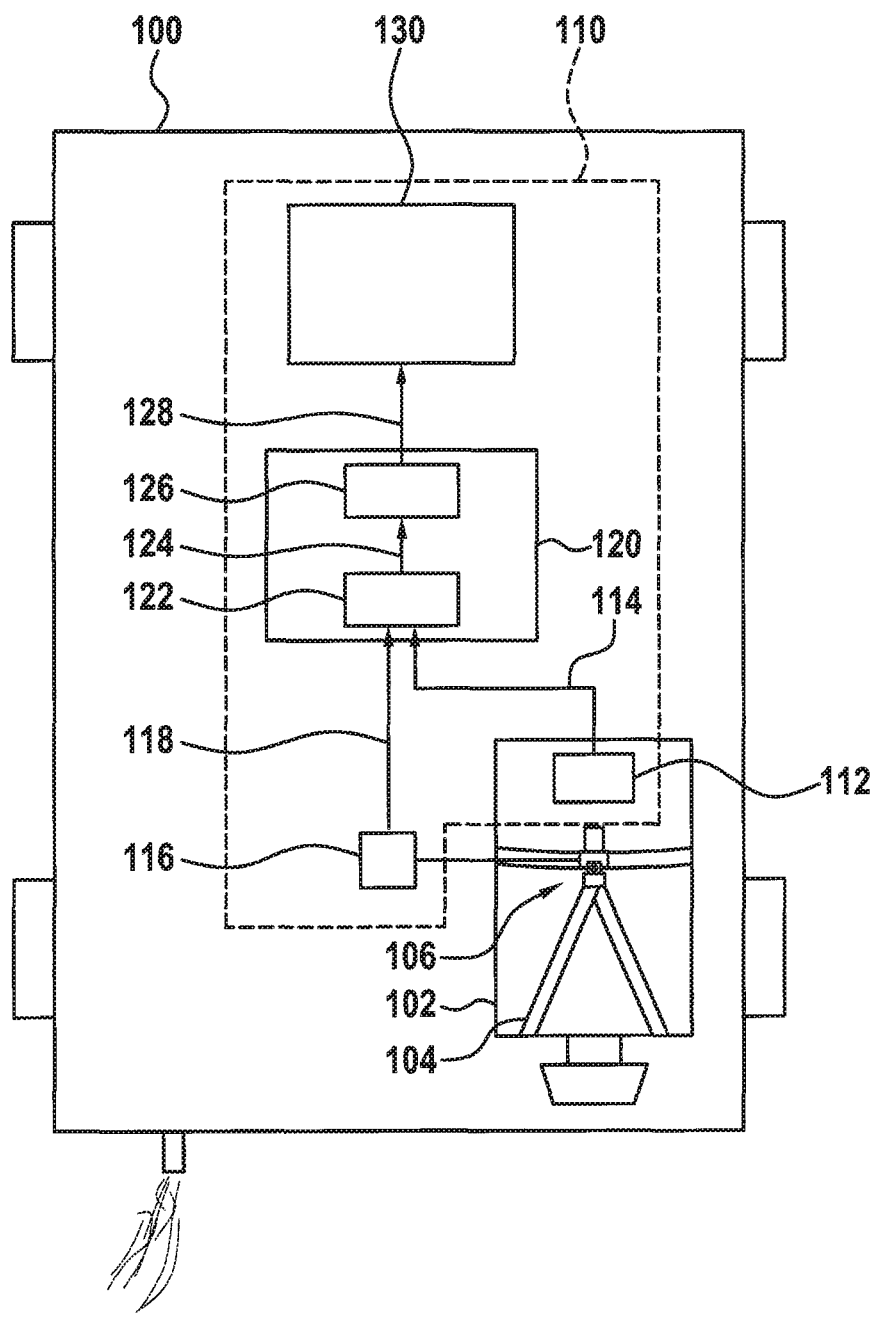
FIG. 1 shows a motor vehicle with a vehicle safety system according to an embodiment of the present invention.

In the following description of advantageous embodiments of the present invention, the same or similar reference numerals shall be used for similar elements depicted in the various figures of the drawings, with repeated description of such elements being omitted.

FIG. 1 shows a motor vehicle 100 with a vehicle safety system according to an embodiment of the present invention. In FIG. 1, the vehicle 100 is an automobile or motorized passenger vehicle, for example. Of the vehicle 100, there are shown a seat 102 with a seat belt 104 and a seat belt buckle 106. Although not shown in FIG. 1, the vehicle of 100 may have a plurality of seats like the seat 102, for example a total of four or five seats. The seat 102 is formed or configured to accommodate children or adults.

The vehicle 100 further comprises a vehicle safety system 110. According to the embodiment shown in FIG. 1, the vehicle safety system 110 includes an in-seat weight sensor 112 disposed in the seat 102, a seat belt buckle sensor 116 associated with the seat belt buckle and 106, a controller 120 for controlling at least one safety function for the motor vehicle 100, and exemplarily one vehicle safety device 130. In another embodiment, the vehicle safety system 110 may include a plurality of vehicle safety devices like the vehicle safety device 130.

The controller 120 is communicatively connected to the weight sensor 112, to the seat belt buckle sensor 116 and to the vehicle safety device 130. The weight sensor 112 is configured to detect child occupancy of the seat 102. Furthermore, the weight sensor 112 is configured to output a first sensor signal 114 representing a detection result. The seat belt buckle sensor 116 is configured to detect a closed or locked state of the seat belt 104 by a switch or the like in the seat belt buckle 106. Moreover, the seat belt buckle sensor 116 is configured to output a second sensor signal 118 representing a detection result.

The controller 120 is configured to control at least one safety function for the motor vehicle 100. In order to do so, the controller 120 is configured to receive the first sensor signal 114 from the weight sensor 112 and the second sensor signal 118 from the seat belt buckle sensor 116. Using the sensor signals 114 and 118, the controller 120 is further configured to output and/or generate and output a control signal 128.

The controller 120 comprises means 122 for determining seat occupancy information 124. The seat occupancy information 124 indicates whether the seat 102 of the vehicle 100 is occupied by a child or not. The means 122 for determining its configured to determine the seat occupancy information 124 on the basis of the sensor signals 114 and 118, which originate from the weight sensor 112 in the seat 102 and from the seat belt buckle sensor 116, respectively. The means 122 for determining is configured to determine seat occupancy information 124 indicating seat occupancy by a child if both sensor signals 114 and 118 are indicative of seat occupancy by a child. The means 122 for determining is further configured to output the seat occupancy information 124.

Furthermore, the controller 120 comprises means 126 for applying the control signal 128 to the vehicle safety device 130 or two an interface to the vehicle safety device 130. The means 126 for applying is configured to receive the seat occupancy information 124 from the means 122 for determining. In particular, the means 126 for applying is configured to output and apply the control signal 128 to the vehicle safety device 130 depending on the seat occupancy information 124. In other words, the means 126 for applying is configured to apply the control signal 128 to the vehicle safety device 130 if the seat occupancy information 124 indicates child occupancy of the seat 102. The control signal 128 comprises child safety settings usable by the vehicle safety device 130 to realize at least one child-relevant safety function.

According to an embodiment, the vehicle safety device 130 or a plurality of vehicle safety devices like the vehicle safety device 130 may comprise a rear-window display device or controller, a vehicle speed controller, a feedback output device or controller, a vehicle systems controller and/or a door and window lock actuator or controller. In other words, the controller 120 or, more precisely, the means 126 for applying is configured to apply the control signal 128 to an interface to a rear-window display device or controller, to an interface to a vehicle speed controller, to an interface to a feedback output device or controller, to an interface to a vehicle systems controller and/or to an interface to a door and window lock actuator or controller. When applied to the rear-window display device or rear-window display controller, the control signal 128 causes the rear-window display device or controller to display a child-on-board or baby-on-board message for following traffic. When applied to the vehicle speed controller, the control signal 128 causes the vehicle speed controller to limit vehicle speed to a child-safe level. When applied to the feedback output device or feedback output controller, the control signal 128 causes the feedback output device or controller to issue an acoustic, optical and/or haptic warning signal regarding child-safe driving parameters. When applied to the vehicle systems controller, the control signal 128 causes the vehicle systems controller to block disabling of at least one vehicle safety system or function. When applied to the door and window lock actuator or door and window lock controller, the control signal 128 causes the door and window lock actuator or controller to lock at least one vehicle door and/or window adjacent to the seat 102 when the vehicle 100 is moving.

Figure 2:
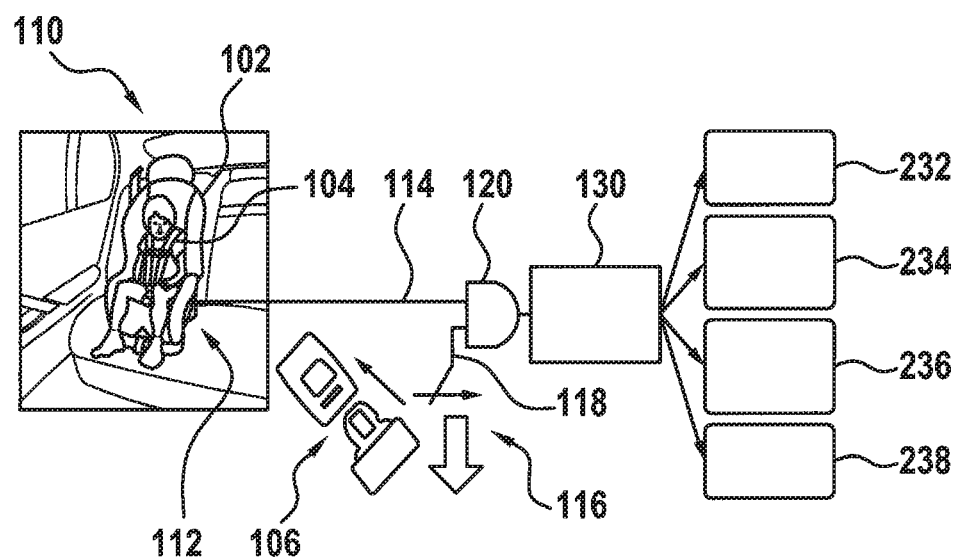
FIG. 2 shows a vehicle safety system according to an embodiment of the present invention.

FIG. 2 shows a vehicle safety system 110 according to an embodiment of the present invention. The vehicle safety system 110 depicted in FIG. 2 is identical or similar with respect to the vehicle safety system shown in FIG. 1. In addition to the vehicle safety system 110, FIG. 2 shows the seat 102, which is a child seat here; with the seat belt 104 and seat belt buckle 106. In FIG. 2, a child is shown seated in the seat 102, a better illustration. The seat belt 104 is closed. Of the vehicle safety system 110, there are shown the weight sensor 112, which is configured to provide the first sensor signal 114, the seat belt buckle sensor 116, which is configured to provide the second sensor signal 118, the controller 120 and the vehicle safety device 130. Furthermore, FIG. 2 shows an exemplary number of four examples of child-related safety functions 232, 234, 236 and 238 it may be initiated or activated by the vehicle safety device 130.

The seat belt buckle sensor 116 comprises a normally open switch in the seat belt buckle 106. The controller 120 is configured to perform an AND combination of the sensor signals 114 and 118, for example. According to the embodiment shown in FIG. 2, the vehicle safety device 130 comprises an electronic control unit (ECU) associated with ESP (Electronic Stability Program; also known as Vehicle Dynamics Control (VDC); Vehicle Stability Control (VSC); Roll Stability Control (RSC); Electronic Stability Control (ESC) or the like), engine control or body control. A first safety function 232 comprises displaying "BABY ON BOARD" or a similar message on a rear windshield of the vehicle. A second safety function 234 comprises enabling speed limiter and driver warning system through engine control ECU. A third safety function 236 comprises disabling functions like "ESP_OFF" and sports mode through ESP ECU. A fourth safety function 238 comprises locking rear doors, if not locked, once the vehicle starts moving.

In the following, a functional description of the vehicle safety system 110 shall be given by way of example.

Baby-on-board or seat occupancy by a child may be detected by the seat belt buckle sensor 116 in the buckle 106 of a baby seat belt 104. For example, the seat belt buckle sensor 116 comprises a Normally Open (NO) switch in the buckle 106. When the buckle 106 is closed (with a baby on board), the switch closes. Thus, the second sensor signal 118 can be output to the controller 120. In order to avoid false-positive detection when the baby seat buckle 106 is closed without a baby in the seat 102, the weight sensor 112 is arranged in the seat 102. The weight sensor 112 may be a simple binary-type sensor detecting only whether a weight threshold is crossed. The logical AND of the sensor signals 114 and 118 from the weight sensor 112 and the seat belt buckle sensor 116, respectively, may be transmitted to the vehicle safety device 130 or ESP or Engine Control or Body Control ECU by a hardwired signal. The recipient ECU may then transmit this seat occupancy information over and in-vehicle network, e.g. CAN (Controller Area Network), to other interacting ECUs. However, depending on system requirements, just the buckle switch or the weight sensor input may also suffice for baby on board detection.

Once the baby-on-board or seat occupancy information is received by the vehicle safety device 130 or body control ECU either through hardwired signal or over CAN, the first safety function 232 can be activated so as to enable the display over the rear windshield of the vehicle. This display serves to alert following drivers and may also be useful in case of emergency. Conventional baby-onboard stickers are common on car rear windshields, but such stickers may obstruct the drivers' rear view. The first safety function 232 serves to replace the sticker with a transparent display over glass. The display can be implemented by using the transparent display technologies or an LED (light-emitting diode) display. Thus, the first safety function 232 may serve to avoid a situation in which many drivers may forget to remove a sticker even when no baby is on board. The vehicle safety system 110 is configured to enable the display only when a baby is really on board.

In accordance with the second safety function 234, children in a car can be protected from overspeed. A speed limiter may be implemented if the seat occupancy information or baby-on-board information is received by the engine control ECU either through hardwired signal or over CAN. Additionally, the driver may be informed about the overspeed by way of recorded audio or a buzzer, for example.

When the seat occupancy information or baby-on-board information is received by the ESP ECU either through hardwired signal or over CAN, functions like Sports Mode and ESP_OFF can be disabled by the vehicle safety system 110 according to the third safety function 236.

According to the fourth safety function 238, once the seat occupancy information or baby-on-board information is received and the vehicle starts moving, which may be detected by means of a wheel speed sensor input to an ABS (Anti-lock Braking System) ECU or the ESP ECU, rear doors and windows may be locked, i.e. CHILD LOCK may be enabled, by the body control ECU.

Figure 3:
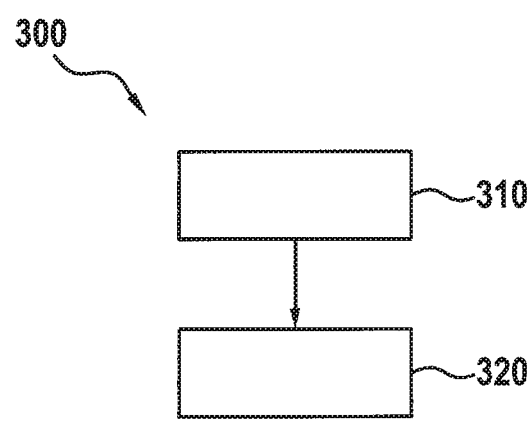
FIG. 3 shows a method for controlling at least one safety function for a motor vehicle according to an embodiment of the present invention.

FIG. 3 shows a method 300 for controlling at least one safety function for a motor vehicle according to an embodiment of the present invention. Method 300 can be executed in conjunction with or using the vehicle safety system or the controller of FIG. 1 or FIG. 2. In other words, the controller of FIG. 1 or FIG. 2 is configured to execute all steps of the method 300.

The method 300 comprises a step 310 of determining seat occupancy information based on sensor signals originating from a seat belt buckle sensor of the seat and from a weight sensor in the seat. The seat occupancy information indicates whether a seat of the vehicle is occupied by a child or not.

Furthermore, the method 300 comprises a step 320 of applying a control signal, which comprises child safety settings, depending on the seat occupancy information to an interface to at least one vehicle safety device.

In other words, in response to or after detecting a child or baby on board, the following safety functions can be triggered, initiated or activated by executing the method 300: displaying a message on the rear windshield; vehicle speed limiting and warning the driver by a recorded voice or buzzer about the overspeed; disabling functions like ESP_OFF, Sports Mode etc. and enabling child lock (if not locked) once the vehicle starts moving.

The embodiments described and depicted in the figures are chosen to be merely exemplary. Embodiments may be combined with each other completely or with respect to distinct features. Also, one embodiment may be supplemented by features of another embodiment.

Furthermore, the method steps presented here may be carried out repeatedly and in an order different from the one described.

In case an embodiment includes a first feature and a second feature linked by "and/or", this means that the embodiment comprises, in a first variant, both the first feature and the second feature and, in a second variant, comprises only one of the first feature and the second feature.

What is claimed is:

1. A method for controlling at least one safety function for a motor vehicle, comprising:
    determining that a selected seat of the vehicle is occupied by a child in response to at least one of (a) a first sensor signal originating from a first sensor indicating that a seat belt of the selected seat is buckled and (b) a second sensor signal originating from a weight sensor in the selected seat indicating presence on the selected seat of a weight that is within a predefined range, a boundary of which is a predefined threshold weight; and
    in response to the determination of the child occupancy of the selected seat, applying a control signal to at least one vehicle safety device;
    wherein at least one of:
        the control signal includes a signal to an actuator that causes the actuator to automatically lock a door of the vehicle that is closest to the selected seat, the determination of the child occupancy of the selected seat is in response to a combination of both the first sensor signal indicating that the seat belt of the selected seat is buckled and the second sensor signal indicating the presence on the selected seat of the weight that is within the predefined range, and the application of the control signal is further conditioned upon a determination that the vehicle is moving;
        the control signal includes a signal that disables at least one automatic transmission mode of the vehicle; and
        the control signal includes a signal that prevents a manual disablement of an electronic stability program (ESP).

2. The method according to claim 1, wherein the control signal further includes a signal applied to one of a rear-window display device or a controller for a rear-window display device, and that causes the rear-window display device to display one of a child-onboard or baby-on-board message for following traffic using a transparent display over glass.

3. The method according to claim 1, wherein the control signal further includes a signal applied to a vehicle speed controller and that causes the vehicle speed controller to limit vehicle speed to a predefined child-safe level.

4. The method according to claim 1, wherein the control signal further includes a signal applied to one of a feedback output device or a controller for a feedback output device and that causes the feedback output device to issue at least one of an acoustic, optical and haptic warning signal regarding at least one child-safe driving parameter.

5. The method according to claim 1, wherein the control signal further includes a signal applied to a window lock actuator or a controller for the window lock actuator and that causes the window lock actuator to lock a window adjacent to the selected seat when the vehicle is moving.

6. A safety system of a vehicle, the safety system comprising:
    a control unit including a processor configured to:
        determine that a selected seat of the vehicle is occupied by a child in response to at least one of (a) a first sensor signal originating from a first sensor indicating that a seat belt of the selected seat is buckled and (b) a second sensor signal originating from a weight sensor in the selected seat indicating presence on the selected seat of a weight that is within a predefined range, a boundary of which is a predefined threshold weight; and
        in response to the determination of the child occupancy of the selected seat, apply a control signal to at least one vehicle safety device; wherein at least one of:
            the control signal includes a signal to an actuator to automatically lock a door of the vehicle that is closest to the selected seat, the determination of the child occupancy of the selected seat is in response to a combination of both the first sensor signal indicating that the seat belt of the selected seat is buckled and the second sensor signal indicating the presence on the selected seat of the weight that is within the predefined range, and the application of the control signal is further conditioned upon a determination that the vehicle is moving;
            the control signal includes a signal to disable at least one automatic transmission mode of the vehicle; and
            the control signal includes a signal to prevent a manual disablement of an electronic stability program (ESP).

7. The vehicle safety system as recited in claim 6, further comprising:
    the at least one vehicle safety device;
    the first sensor; and
    the second weight sensor;
    wherein the control unit is communicatively connected to the least one vehicle safety device and to the first and second sensors.

8. A non-transitory, computer-readable data storage medium storing a computer program having program codes which, when executed on a computer, cause the computer to perform a method for controlling at least one safety function for a motor vehicle, the method comprising:
    determining that a selected seat of the vehicle is occupied by a child in response to at least one of (a) a first sensor signal originating from a first sensor indicating that a seat belt of the selected seat is buckled and (b) a second sensor signal originating from a weight sensor in the selected seat indicating presence on the selected seat of a weight that is within a predefined range, a boundary of which is a predefined threshold weight; and
    in response to the determination of the child occupancy of the selected seat, applying a control signal to at least one vehicle safety device;
    wherein at least one of:
        the control signal includes a signal to an actuator that causes the actuator to automatically lock a door of the vehicle that is closest to the selected seat, the determination of the child occupancy of the selected seat is in response to a combination of both the first sensor signal indicating that the seat belt of the selected seat is buckled and the second sensor signal indicating the presence on the selected seat of the weight that is within the predefined range, and the application of the control signal is further conditioned upon a determination that the vehicle is moving;

the control signal includes a signal that disables at least one automatic transmission mode of the vehicle; and the control signal includes a signal that prevents a manual disablement of an electronic stability program (ESP).

9. The computer-readable data storage medium of claim 8, wherein the control signal includes the signal to the actuator that causes the actuator to automatically lock the door of the vehicle that is closest to the selected seat, the determination of the child occupancy of the selected seat is in response to the combination of both the first sensor signal indicating that the seat belt of the selected seat is buckled and the second sensor signal indicating the presence on the selected seat of the weight that is within the predefined range, and the application of the control signal is further conditioned upon the determination that the vehicle is moving.

10. The computer-readable data storage medium of claim 8, wherein the control signal includes the signal that disables at least one automatic transmission mode of the vehicle.

11. The computer-readable data storage medium of claim 8, wherein the control signal includes the signal that prevents the manual disablement of the ESP.

12. The vehicle safety system as recited in claim 6, wherein the control signal includes the signal to the actuator to automatically lock the door of the vehicle that is closest to the selected seat, the determination of the child occupancy of the selected seat is in response to the combination of both the first sensor signal indicating that the seat belt of the selected seat is buckled and the second sensor signal indicating the presence on the selected seat of the weight that is within the predefined range, and the application of the control signal is further conditioned upon the determination that the vehicle is moving.

13. The vehicle safety system as recited in claim 6, wherein the control signal includes the signal that disables the at least one automatic transmission mode of the vehicle.

14. The vehicle safety system as recited in claim 6, wherein the control signal includes the signal that prevents the manual disablement of the ESP.

15. The method according to claim 1, wherein the control signal includes the signal to the actuator that causes the actuator to automatically lock the door of the vehicle that is closest to the selected seat, the determination of the child occupancy of the selected seat is in response to the combination of both the first sensor signal indicating that the seat belt of the selected seat is buckled and the second sensor signal indicating the presence on the selected seat of the weight that is within the predefined range, and the application of the control signal is further conditioned upon the determination that the vehicle is moving.

16. The method according to claim 1, wherein the control signal includes the signal that disables the at least one automatic transmission mode of the vehicle.

17. The method according to claim 16, wherein the at least one automatic transmission mode includes a sport automatic transmission mode.

18. The method according to claim 1, wherein the control signal includes the signal that prevents the manual disablement of the ESP.

19. The method according to claim 1, wherein the control signal further includes a signal applied to a window lock actuator or a controller for the window lock actuator and that causes the window lock actuator to lock a window adjacent to the selected seat when the vehicle is moving and the first sensor signal indicates that the seat belt of the selected seat is buckled.

20. The vehicle safety system as recited in claim 12, wherein the second sensor signal is a binary signal indicating only whether a sensed weight is at least as great as a minimum weight.

21. The vehicle safety system as recited in claim 12, wherein:

the control unit is configured to apply the control signal to the actuator to automatically lock the door in response to received signals that include only the combination of both the first sensor signal and the second sensor signal;

the first sensor signal indicates only that the seat belt of the selected seat is buckled;

the boundary of the predefined range of weights that is formed by the predefined threshold weight is a minimum weight value;

the predefined range of weights includes all weights at least as great as the minimum weight value; and the second sensor signal is a binary signal that indicates only that a weight that is present on the selected seat is at least as great as the predefined threshold weight.

* * * * *